United States Patent
Matsuda

(10) Patent No.: US 9,967,408 B2
(45) Date of Patent: May 8, 2018

(54) INFORMATION SETTING APPARATUS, INFORMATION MANAGEMENT APPARATUS, INFORMATION GENERATION APPARATUS, AND METHOD AND PROGRAM FOR CONTROLLING THE SAME

(71) Applicant: CANON KABUSHIKI KAISHA, Tokyo (JP)

(72) Inventor: Araki Matsuda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 42 days.

(21) Appl. No.: 15/077,755

(22) Filed: Mar. 22, 2016

(65) Prior Publication Data
US 2016/0286057 A1    Sep. 29, 2016

(30) Foreign Application Priority Data

Mar. 26, 2015    (JP) .................................. 2015-065244
Mar. 10, 2016    (JP) .................................. 2016-047057

(51) Int. Cl.
*H04N 5/232* (2006.01)
*H04N 5/76* (2006.01)
(Continued)

(52) U.S. Cl.
CPC ..... *H04N 1/00114* (2013.01); *H04N 1/00209* (2013.01); *H04N 1/00244* (2013.01);
(Continued)

(58) Field of Classification Search
CPC .......... H04N 13/0062; H04N 13/0066; H04N 1/00114; H04N 1/00209; H04N 1/00244; H04N 1/2112; H04N 1/2125; H04N 1/32106; H04N 2201/0039; H04N 2201/0049; H04N 2201/006; H04N 2201/0084; H04N 2201/3242; H04N 2201/325; H04N 1/32101; H04N 1/32128; H04N 2201/3274; H04N 1/32117; H04N 21/472; H04N 1/00137; H04N 1/00164; G06F 17/30244; G06F 17/3028;
(Continued)

(56) References Cited

U.S. PATENT DOCUMENTS 6,850,248 B1 *    2/2005   Crosby ............. G06F 17/30905
                                                              345/428
2002/0067500 A1 *  6/2002   Yokomizo ............... G06T 11/60
                                                              358/1.15
(Continued)

FOREIGN PATENT DOCUMENTS

JP    2011010011 A    1/2011

*Primary Examiner* — Chia-Wei A Chen
(74) *Attorney, Agent, or Firm* — Canon U.S.A., Inc. IP Division

(57) ABSTRACT

A camera generates a main image and a sub image of which data size is smaller than that of the main image, and stores them in association with an image ID. The camera transmits the image ID and the sub image to a tablet device, and transmits the image ID and the main image to the PC. The tablet device executes a development process on the sub image and generates an adjustment value, and transmits the adjustment value together with the image ID to a server. The PC receives the adjustment value based on the image ID from the server and uses the adjustment value for a development process on the main image.

17 Claims, 12 Drawing Sheets

(51) Int. Cl.
  *H04N 5/228* (2006.01)
  *H04N 1/00* (2006.01)
  *H04N 1/21* (2006.01)
  *H04N 1/32* (2006.01)

(52) U.S. Cl.
  CPC ......... *H04N 1/2112* (2013.01); *H04N 1/2125* (2013.01); *H04N 1/32106* (2013.01); *H04N 2201/006* (2013.01); *H04N 2201/0039* (2013.01); *H04N 2201/0049* (2013.01); *H04N 2201/0084* (2013.01)

(58) Field of Classification Search
  CPC ............. G06F 17/3007; G06F 17/3012; G06F 17/30123; G06F 3/04845; G06T 1/00; G06T 1/0007
  See application file for complete search history.

(56) References Cited

U.S. PATENT DOCUMENTS

| | | | | |
|---|---|---|---|---|
| 2002/0165930 A1* | 11/2002 | Theriault | ........... | G11B 27/3027 709/214 |
| 2003/0009569 A1* | 1/2003 | McIntyre | ............... | G06Q 30/06 709/229 |
| 2003/0105795 A1* | 6/2003 | Anderson | ............... | G06F 9/547 718/101 |
| 2003/0107760 A1* | 6/2003 | King | ................. | H04N 1/00132 358/1.15 |
| 2003/0231240 A1* | 12/2003 | Wilkins | ............. | H04N 1/32101 348/207.99 |
| 2005/0052469 A1* | 3/2005 | Crosby | ............. | G06F 17/30905 345/619 |
| 2006/0152609 A1* | 7/2006 | Prentice | ................ | G06T 1/0007 348/272 |
| 2006/0193012 A1* | 8/2006 | Wilkins | ............. | H04N 1/32101 358/452 |
| 2006/0233515 A1* | 10/2006 | Hino | ................... | G11B 27/034 386/225 |
| 2007/0033295 A1* | 2/2007 | Marriott | ................... | G06F 8/65 709/248 |
| 2007/0143467 A1* | 6/2007 | Takahashi | ........... | G06F 17/3028 709/223 |
| 2008/0013914 A1* | 1/2008 | Shinkai | .................. | H04N 5/77 386/224 |
| 2008/0282195 A1* | 11/2008 | Nakagawa | .......... | G06F 17/3028 715/838 |
| 2009/0124387 A1* | 5/2009 | Perlman | ................. | A63F 13/12 463/42 |
| 2009/0172754 A1* | 7/2009 | Furukawa | .............. | H04N 5/765 725/91 |
| 2009/0231441 A1* | 9/2009 | Walker | ............. | G06F 17/30265 348/207.1 |
| 2010/0091136 A1* | 4/2010 | Nakase | .............. | H04N 1/00204 348/231.2 |
| 2012/0082437 A1* | 4/2012 | Shiomi | .................... | H04N 5/76 386/286 |
| 2012/0206653 A1* | 8/2012 | Graves | ................. | G11B 27/031 348/571 |
| 2012/0313934 A1* | 12/2012 | Akagi | ................ | H04N 13/0048 345/419 |
| 2013/0222583 A1* | 8/2013 | Earnshaw | ........ | H04N 21/47202 348/143 |
| 2013/0235074 A1* | 9/2013 | Cherna | ................... | G06T 11/00 345/619 |
| 2013/0308015 A1* | 11/2013 | Aokage | ................ | H04N 5/76 348/231.99 |
| 2013/0308642 A1* | 11/2013 | Kimura | ................... | H04L 47/25 370/392 |
| 2014/0375648 A1* | 12/2014 | Katakawa | ................ | G06T 3/40 345/428 |
| 2015/0213625 A1* | 7/2015 | Berger | .................... | G06T 11/00 382/302 |
| 2016/0203194 A1* | 7/2016 | Park | .................... | G06F 3/0482 707/722 |
| 2017/0097922 A1* | 4/2017 | Kirtkow | ............. | G06F 17/2252 |
| 2017/0244895 A1* | 8/2017 | Zilberman | ............. | G06T 7/337 |
| 2017/0353390 A1* | 12/2017 | Kimura | ............. | H04N 1/32101 |

* cited by examiner

FIG. 7A  711

| USER ID | IMAGE ID | UPDATE NUMBER |
|---|---|---|
| User_123 | Img_A | 12 |
| User_123 | Img_B | 15 |
| User_123 | Img_C | 7 |
| User_123 | Img_D | 6 |
| User_123 | Img_E | 14 |
| User_123 | Img_F | 16 |
| User_123 | Img_H | 17 |
| ... | ... | ... |
| User_551 | Img_Q | 3 |
| ... | ... | ... |

FIG. 7B  721

| IMAGE ID | UPDATE NUMBER | PRESENCE OR ABSENCE OF UNPROVIDED ADJUSTMENT INFORMATION |
|---|---|---|
| Img_A | 8 | False |
| Img_B | 10 | False |
| Img_C | 7 | True |
| Img_D | 6 | False |
| Img_E | 11 | True |
| Img_F | 5 | True |
| Img_G | Null | True |

FIG. 7C  722

| IMAGE ID | UPDATE NUMBER | PRESENCE OR ABSENCE OF UNPROVIDED ADJUSTMENT INFORMATION |
|---|---|---|
| Img_A | 12 | False |
| Img_B | 15 | False |
| Img_C | 7 | True |
| Img_D | 6 | False |
| Img_E | 14 | True |
| Img_F | 16 | True |
| Img_G | Null | True |
| Img_H | 17 | False |

FIG. 7D  713

| USER ID | IMAGE ID | UPDATE NUMBER |
|---|---|---|
| User_123 | Img_A | 12 |
| User_123 | Img_B | 15 |
| User_123 | Img_C | 18 |
| User_123 | Img_D | 6 |
| User_123 | Img_E | 19 |
| User_123 | Img_F | 20 |
| User_123 | Img_G | 21 |
| User_123 | Img_H | 17 |
| ... | ... | ... |
| User_551 | Img_Q | 3 |
| ... | ... | ... |

FIG. 7E  723

| IMAGE ID | UPDATE NUMBER | PRESENCE OR ABSENCE OF UNPROVIDED ADJUSTMENT INFORMATION |
|---|---|---|
| Img_A | 12 | False |
| Img_B | 15 | False |
| Img_C | 18 | False |
| Img_D | 6 | False |
| Img_E | 19 | False |
| Img_F | 20 | False |
| Img_G | 21 | False |
| Img_H | 17 | False |

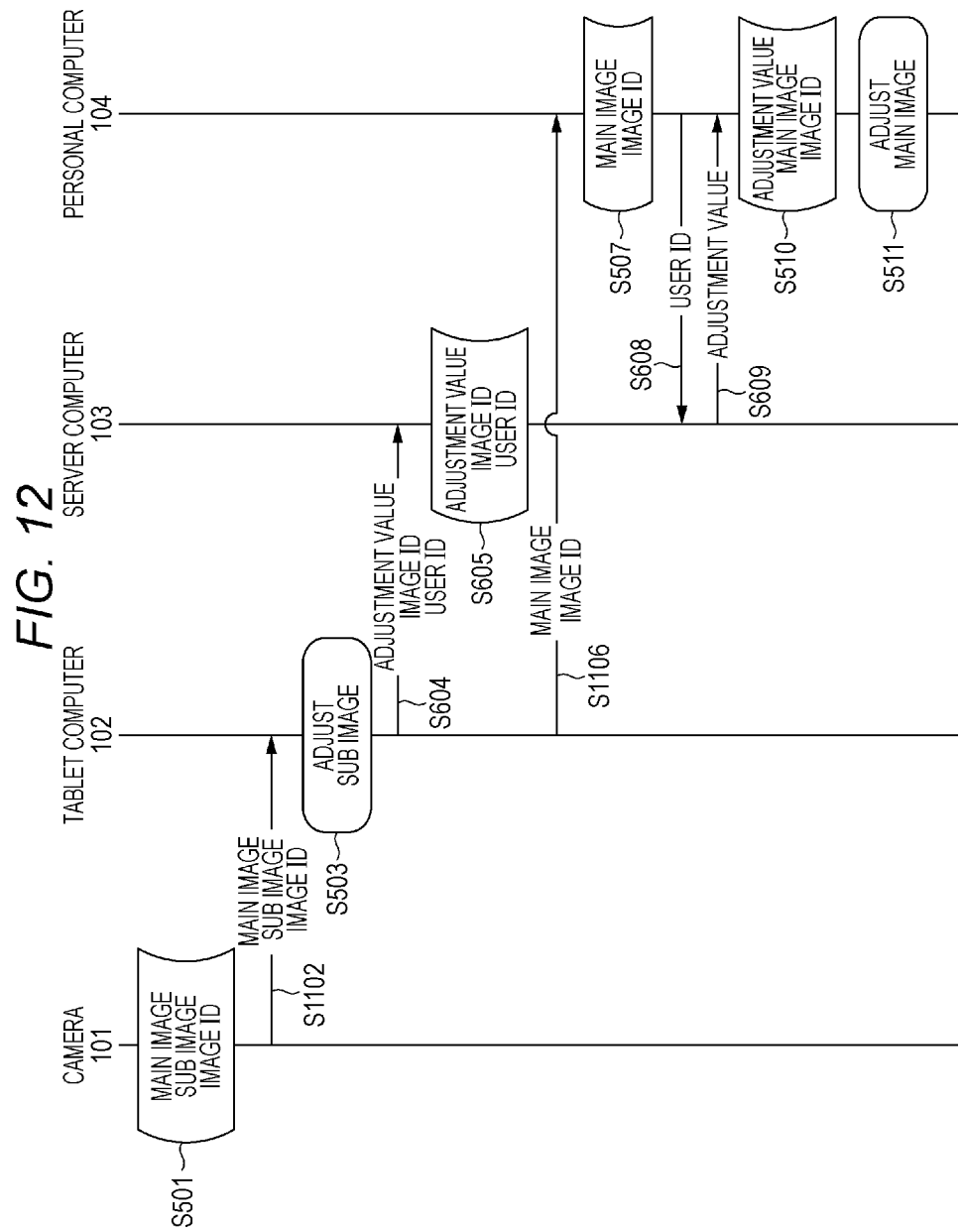

US 9,967,408 B2

INFORMATION SETTING APPARATUS, INFORMATION MANAGEMENT APPARATUS, INFORMATION GENERATION APPARATUS, AND METHOD AND PROGRAM FOR CONTROLLING THE SAME

BACKGROUND OF THE INVENTION

Field of the Invention

The present invention relates to an imaging apparatus, an information setting apparatus, an information management apparatus, and an information generation apparatus for executing image processing with a plurality of devices, and a method and a program for controlling these apparatuses.

Description of the Related Art

Individual users may have a wide variety of information communication devices such as digital cameras, personal computers (PCs), tablet terminals, and smart phones. The user wishes to use the different information communication devices to display or edit even the same image depending on intended purposes and situations. There is a technique by which, in the case where the same image can be recorded in a camera and a PC and replayed on these devices, when the image is subjected to image processing at one device, the other device is instructed to execute the same image processing on the image at the other device to synchronize the results of the image processing (refer to Japanese Patent Application Laid-Open No. 2011-010011).

SUMMARY OF THE INVENTION

A plurality of information communication devices possessed by a user may differ in display screen size, communication capability, storage capacity, and others. Accordingly, there is demand for a technique by which the individual information communication devices handle their respective optimum images and perform image processing on the images such that the image processing can be efficiently executed on the same image, unlike the related art by which the camera and the PC handle the same image.

To solve the foregoing issue, one embodiment of the present invention according to the subject application is an information processing system including an information setting apparatus, an information management apparatus, an information generation apparatus, and an imaging apparatus being communicable with the information setting apparatus and the information generation apparatus, wherein the imaging apparatus includes: a first storage unit that stores a main image and a sub image in association with an image ID, a data amount of the sub image being smaller than a data amount of the main image; a first transmission unit that transmits the image ID and the sub image to the information setting apparatus; and a second transmission unit that transmits the image ID and the main image to the information generation apparatus, the information setting apparatus includes: a setting unit that executes a development process on the sub image and sets an adjustment value for use in the development process; and a third transmission unit that transmits the image ID and the adjustment value to the information management apparatus, the information management apparatus includes: a second storage unit that stores the image ID and the adjustment value in association with each other; a first reception unit that receives the image ID from the information generation apparatus; and a fourth transmission unit that transmits the adjustment value stored in association with the image ID to the information generation apparatus, and the information generation apparatus includes a generation unit that executes a development process on the main image using the adjustment value and generates the results of the development process.

Further features of the present invention will become apparent from the following description of exemplary embodiments (with reference to the attached drawings).

BRIEF DESCRIPTION OF THE DRAWINGS

FIGS. 7A, 7B, 7C, 7D, and 7E are diagrams illustrating examples of update management tables held by the server 103 and the tablet 102 according to the embodiment of the present invention.

FIG. 12 is a sequence diagram illustrating an example of operations of the camera 101, the tablet 102, the server 103, and the PC 104 according to the embodiment of the present invention.

DESCRIPTION OF THE EMBODIMENTS

Preferred embodiments of the present invention will be exemplified and described in detail with reference to the drawings. However, the constituent elements of the embodiments are merely examples but are not intended to limit the scope of the present invention to them.

First Embodiment

Figure 1:
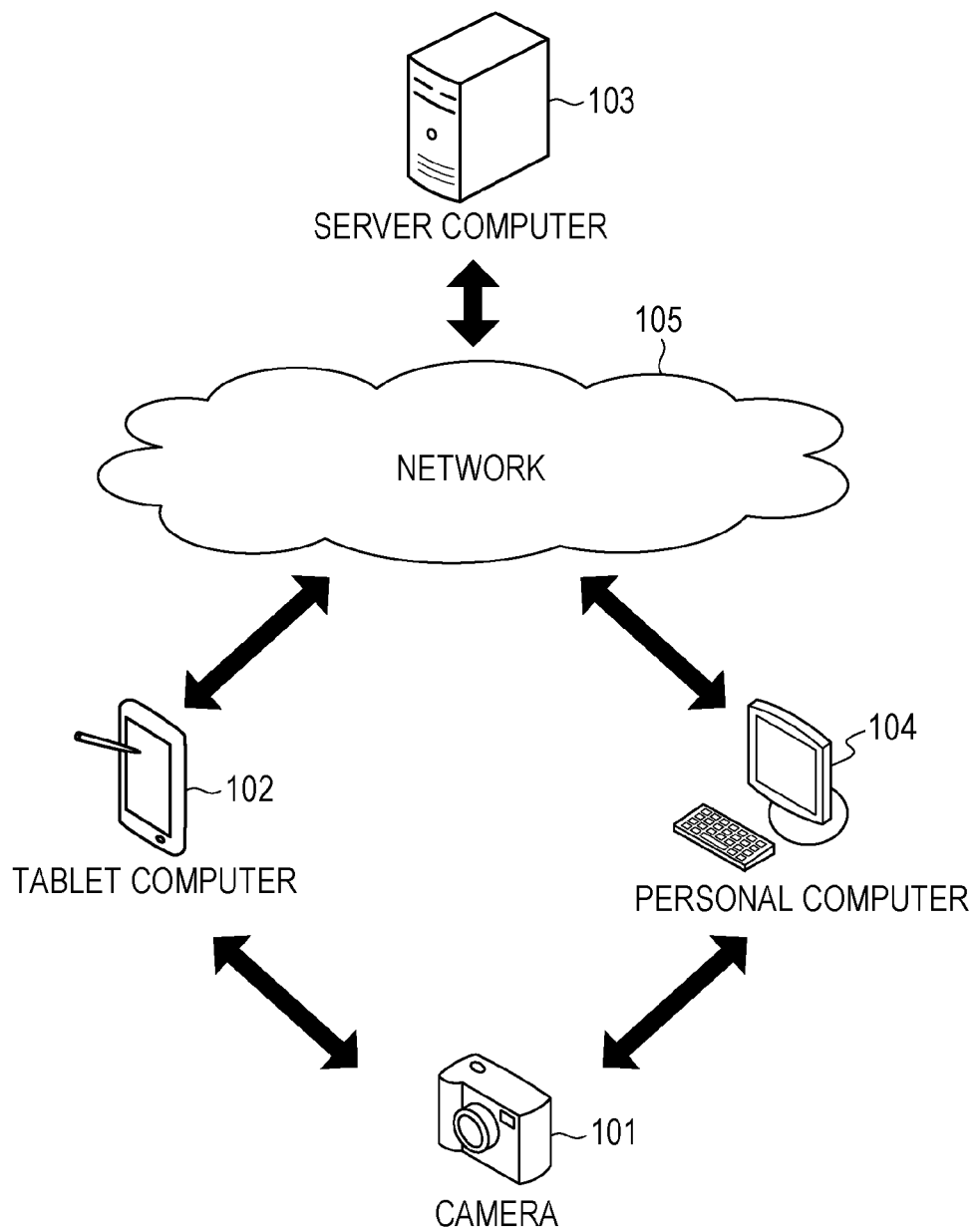
FIG. 1 is a diagram illustrating an example of an information processing system according to one embodiment of the present invention.

FIG. 1 is a diagram illustrating an entire configuration of an information processing system of a first embodiment. A camera 101, a tablet computer (hereinafter, referred to as tablet) 102, and a personal computer (hereinafter, referred to as PC) 104 are communicable with external devices in a wireless or wired manner. For example, the camera 101 performs an imaging process to generate a main image and a sub image, and transmits a RAW file including the main image and the sub image to the PC 104 via a wired connection. The camera 101 also transmits a sub RAW file including only the sub image to the tablet 102 via a wireless connection. The tablet 102 and the PC 104 are connectable to a network 105 such as the Internet to transmit and receive data to and from a server computer (hereinafter, referred to as server) 103 on the network 105.

Figure 2:
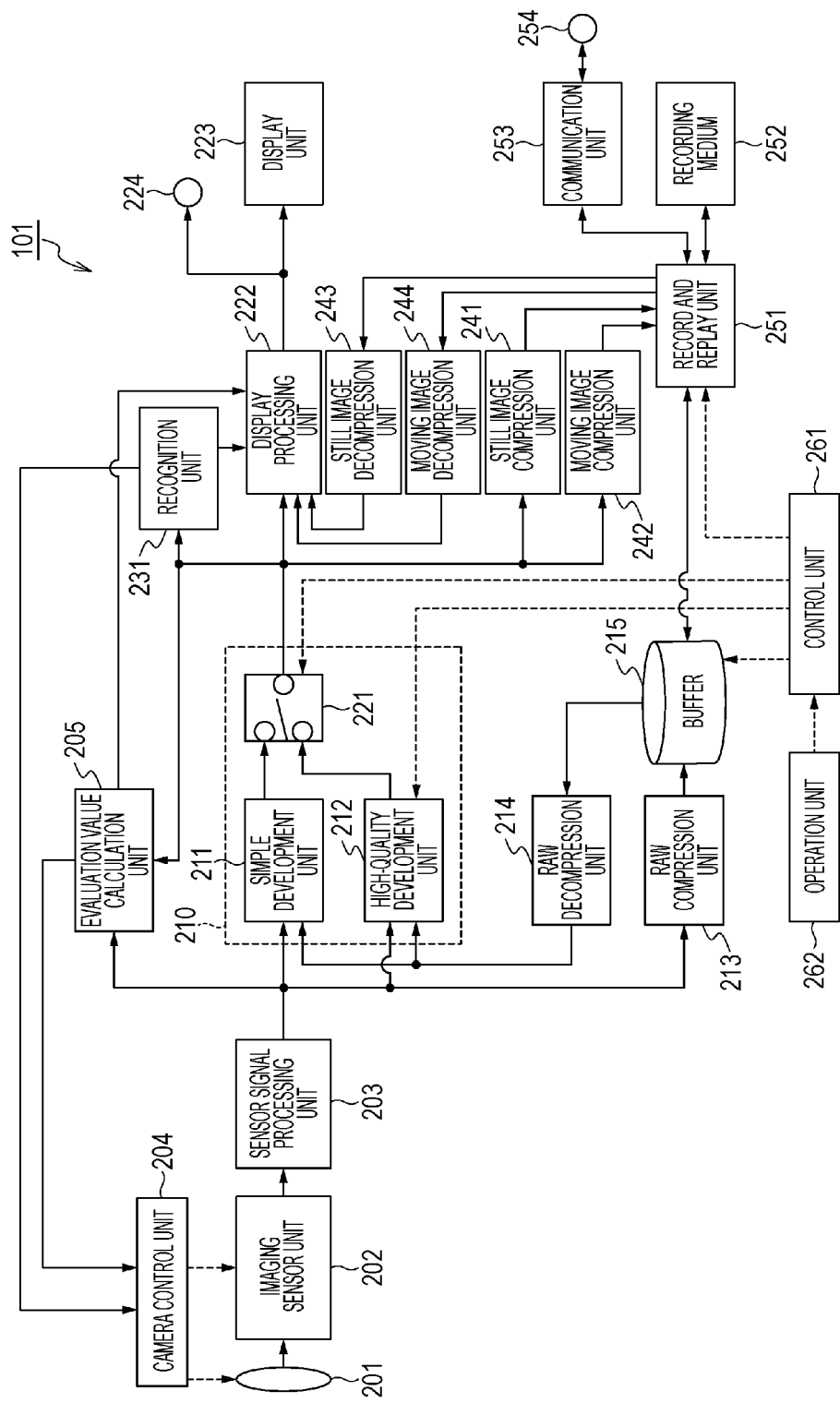
FIG. 2 is a diagram illustrating a configuration example of an imaging apparatus according to the embodiment of the present invention.

FIG. 2 is a block diagram illustrating a configuration of the camera 101 of the embodiment. The camera 101 is implemented by an imaging apparatus such as a digital camera, a camera-equipped smart phone, or a scanner. The camera 101 has the function of recording image information obtained by imaging a subject in a recording medium, the function of reproducing the image information from the recording medium and developing and displaying the same, and the function of transmitting and receiving image information to and from external devices. Therefore, the imaging apparatus according to the embodiment of the present invention can also be expressed as image processing apparatus, recording apparatus, reproducing apparatus, recording and reproducing apparatus, communication apparatus, and the like.

Referring to FIG. 2, a control unit 261 is implemented by an arithmetic processing unit such as a central processing unit (CPU) or a micro processing unit (MPU). The control unit 261 executes a control program stored in a memory to control the entire processing of the camera 101. An operation unit 262 includes input devices such as keys, buttons, and a touch panel used by the user to give instructions to the camera 101. The control unit 261 detects an operation signal from the operation unit 262, and performs a control such that an action is taken according to the operation. A display unit 223 includes a liquid crystal display (LCD) and the like for displaying shot or reproduced images, a menu screen, various kinds of information, and others in the camera 101.

When the operation unit 262 gives an instruction for starting the shooting action, an optical image of a subject to be imaged is input via an imaging optical unit 201 and is formed on an imaging sensor unit 202. At the time of shooting, a camera control unit 204 controls operations of the imaging optical unit 201 and the imaging sensor unit 202, based on the results of evaluation value calculations on diaphragm, focus, camera shake, and others acquired by an evaluation value calculation unit 205, and subject information such as the result of face recognition extracted by a recognition unit 231.

The imaging sensor unit 202 converts light having passed through mosaic color filters of red, green, and blue (RGB) arranged for individual pixels into electrical signals. The color filters arranged at the imaging sensor unit 202 form a pixel array of an image treated by the camera 101. The red (R), green (G), and blue (B) filters are arranged for individual pixels in a mosaic form, and sets of one red pixel, one blue pixel, and two green pixels in a 2×2 matrix are regularly aligned. This pixel arrangement is generally called Bayer array.

The electric signal converted by the imaging sensor unit 202 is subjected to pixel recovery process by a sensor signal processing unit 203. The recovery process includes interpolating the values of the pixels to be recovered such as missing pixels and low-reliability pixels in the imaging sensor unit 202 by the use of peripheral pixel values and subtracting a predetermined offset value from these pixel values. In this embodiment, image information output from the sensor signal processing unit 203 or the image information with no development process yet completed will be referred to as RAW information.

The RAW information is subjected to a development process at a development unit 210. The development unit 210 has a plurality of different development processing units. Specifically, the development unit 210 is composed of a simple development unit 211 as a first development unit, a high-quality development unit 212 as a second development unit, and a switch unit 221 for selecting output from the development units. Both the simple development unit 211 and the high-quality development unit 212 perform a development process on the RAW information to use a debayer process (demosaic process), that is, a color interpolation process to convert the same into brightness and color-difference (and primary color) signals, remove noise from the signals, and correct optical distortion for optimization of the image.

In particular, the high-quality development unit 212 performs the processes with a higher accuracy than the simple development unit 211. Due to the higher accuracy, the high-quality development unit 212 can obtain a higher-quality developed image than that of the simple development unit 211 but the high-quality development unit 212 is under a larger processing load. Accordingly, the high-quality development unit 212 of the embodiment is not dedicated to real-time development in parallel to shooting operation but is capable of conducting distributed processing with a significant idle time taken after shooting. By performing high-quality development after shooting, not simultaneously with shooting, it is possible to suppress an increase in circuit scale and a rise (peak) in power consumption at low levels. Meanwhile, the simple development unit 211 is configured to have low throughput for a high-speed development process during shooting despite lower image quality than in the high-quality development unit 212. Under a low processing load, the simple development unit 211 is used for real-time development in parallel to the shooting operation. The switch unit 221 is controlled by the control unit 261 depending on the contents of the operation specified by the user through the operation unit 262 and the current operation mode. In conjunction with the control of the switch unit 221, either the simple development unit 211 or the high-quality development unit 212 as a target of signal output may perform the development operation.

In the embodiment, the simple development unit 211 and the high-quality development unit 212 exist independently within the development unit 210. Alternatively, one development unit may switch between operation modes to perform selectively the simple development process and the high-quality development process.

The image information developed by the development unit 210 is subjected to a predetermined display process at a display processing unit 222, and then is displayed on the display unit 223. The developed image information may also be output by a video output terminal 224 to an external display device connected to the outside. The video output terminal 224 includes a general-purpose interface such as HDMI (registered trademark) or SDI, for example.

The image information developed by the development unit 210 is also supplied to the evaluation value calculation unit 205. The evaluation value calculation unit 205 calculates evaluation values of focus state, exposure state, and the like from the image information.

The image information developed by the development unit 210 is also supplied to the recognition unit 231. The recognition unit 231 has the function of detecting and recognizing subject information on human face, person, and the like in the image information. For example, the recognition unit 231 detects a human face in a screen indicated by the image information, outputs information on the position of the human face, if any, and authenticates a specific person based on feature information on human face and the like.

The image information developed by the development unit 210 is supplied to a still image compression unit 241 or a moving image compression unit 242. The still image compression unit 241 is used to compress the image information as a still image. The moving image compression unit 242 is used to compress the image information as a moving image. Both the still image compression unit 241 and the moving image compression unit 242 perform high-efficiency encoding (compression encoding) of the target image information to produce compressed image information and convert the same into an image file (still image file or moving image file). The still image compression can be performed by JPEG or the like, and the moving image compression can be performed by MPEG-2, H.264, H.265, or the like.

Figure 3:
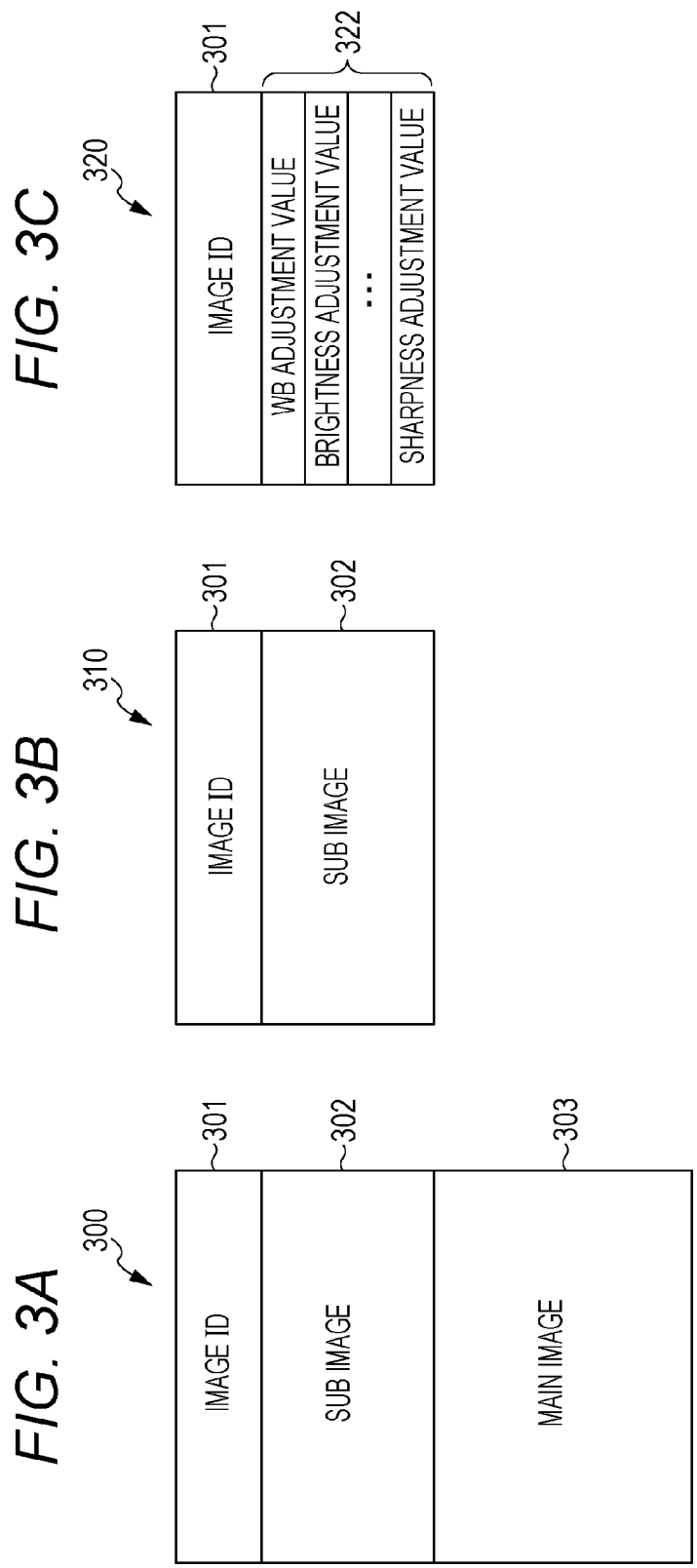
FIGS. 3A, 3B, and 3C are diagrams illustrating configuration examples of a RAW file, a sub RAW file, and adjustment information according to the embodiment of the present invention.

A RAW compression unit 213 performs high-efficiency encoding of the RAW information output by the sensor signal processing unit 203 with the use of a technique such as wavelet transform or difference encoding to covert the RAW information to a compressed RAW file, and stores the same in a buffer unit (storage medium) 215. The RAW file may be kept in the buffer unit 215 for reading again later, or may be moved from the buffer unit 215 to another recording medium (deleted from the buffer unit 215). In the embodiment, one unit of RAW information is subjected to different compression processes to produce a plurality of units of RAW data different in data amount. In the following description, the RAW data larger in data amount will be called main image, and the RAW data smaller in data amount will be called sub image. As illustrated in FIG. 3A, the RAW file includes an image ID 301 for unique identification of the RAW file, a main image 303, and a sub image 302.

The RAW file, the still image file, and the moving image file are recorded by a record and replay unit 251 into a recording medium 252. The recording medium 252 may be a built-in large-capacity semiconductor memory or hard disk, or a detachable memory card, or the like. The record and replay unit 251 can read the still image file, the moving image file, and the RAW file from the recording medium 252.

The record and replay unit 251 can write or read various files into or from external storages and servers via a communication unit 253. The communication unit 253 is capable of accessing the Internet and external devices with the use of a communication terminal 254 through wireless or wired communications.

When the reproducing action is started, the record and replay unit 251 acquires a desired file from the recording medium 252 or via the communication unit 253 and reproduces the same. When the file to be reproduced is a RAW file, the record and replay unit 251 stores the acquired RAW file in the buffer unit 215. When the file to be reproduced is a still image file, the record and replay unit 251 supplies the acquired still image file to a still image decompression unit 243. When the file to be reproduced is a moving image file, the record and replay unit 251 supplies the acquired moving image file to a moving image decompression unit 244.

A RAW decompression unit 214 reads the RAW file from the buffer unit 215, and decodes and decompresses the compressed RAW file. The RAW file decompressed by the RAW decompression unit 214 is supplied to the development unit 210 and input into the simple development unit 211 or the high-quality development unit 212 within the development unit 210.

The still image decompression unit 243 decodes and decompresses the input still image file, and supplies the same as a reproduced still image to the display processing unit 222. The moving image decompression unit 244 decodes and decompresses the input moving image file, and supplies the same as a reproduced moving image to the display processing unit 222.

Figure 4:
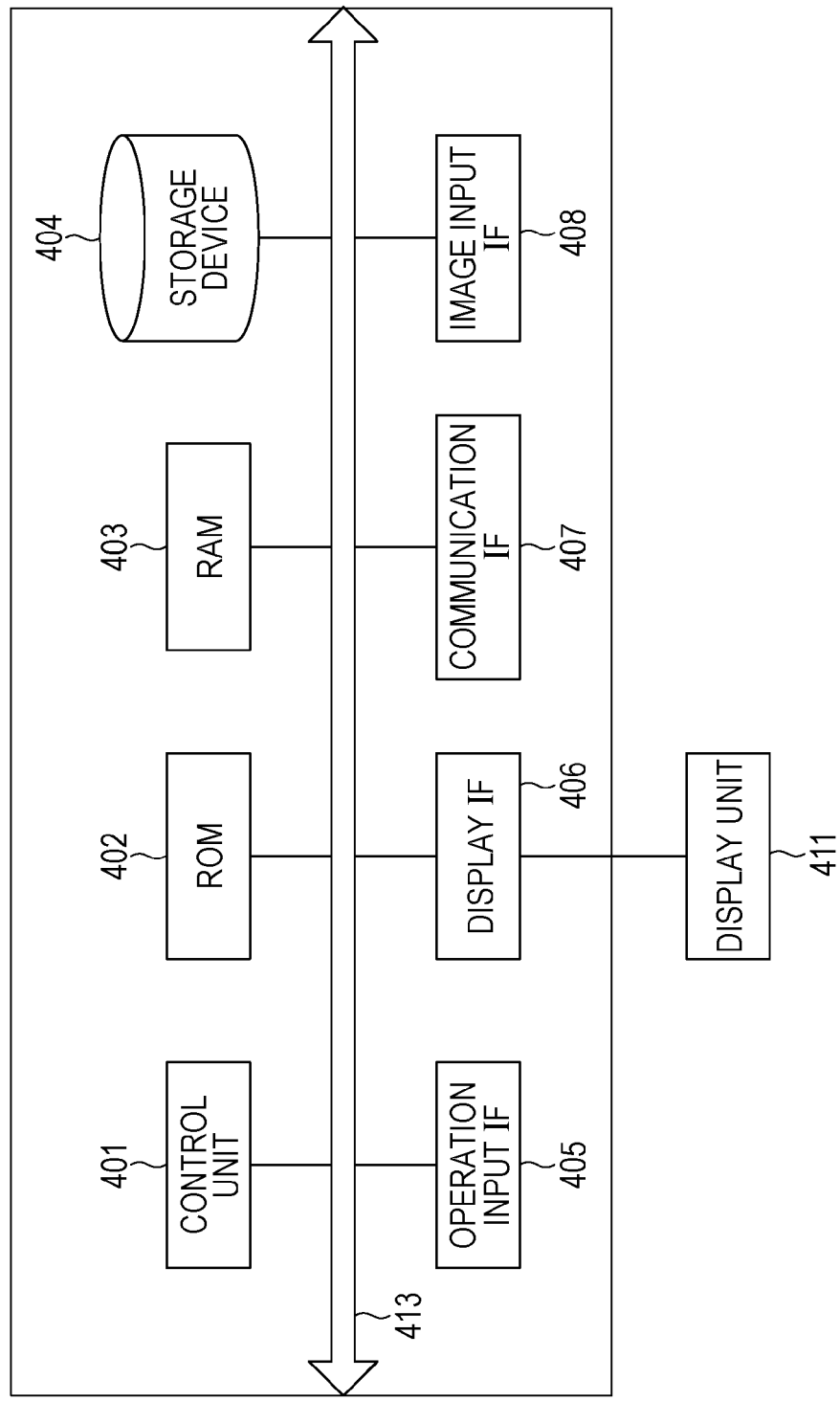
FIG. 4 is a diagram illustrating a configuration example of an information processing apparatus according to the embodiment of the present invention.

FIG. 4 is a diagram illustrating a configuration of an information processing apparatus that implements independently the tablet 102, the PC 104, and the server 103 of the embodiment. The tablet 102, the PC 104, and the server 103 may be implemented by a single computer device, or may be implemented by functions distributed among a plurality of computer devices as necessary. When the information processing apparatus is composed of a plurality of computer devices, the devices are connected together in a mutually communicable manner via a local area network (LAN) or the like.

Referring to FIG. 4, a control unit 401 controls the entire information processing apparatus and is implemented by a CPU or an MPU, for example. A read only memory (ROM) 402 stores programs and parameters without requiring changes. A random access memory (RAM) 403 stores temporarily programs and data supplied from external devices and others. A storage device 404 is a stationary hard disk drive (HDD), a solid state drive (SSD) composed of a flash memory, a hybrid drive composed of a hard disk and a flash memory, a memory card, or the like. The storage device 404 stores programs such as an operating system (OS). An input interface 405 connects to a pointing device for data input or an input device such as a keyboard or a touch panel in response to a user operation. The touch panel is superimposed in a flat shape on a display unit 411 and includes a touch sensor to output coordinate information according to the detected touch position of an object. A bit move unit (BMU) 406 controls data transfer between memories (for example, a VRAM 407 and another memory) or between a memory and each I/O device (for example, a communication interface 409), for example. A video RAM (VRAM) 407 draws images for display on the display unit 411. The images generated by the VRAM 407 are transmitted to the display unit 411 under predetermined standards, and the display unit 411 displays the images. The communication interface 409 connects to networks such as the Internet, WiFi, and Bluetooth (registered trademark). A system bus 412 connects the units 401 to 409 together in a communicable manner. In the following description of the embodiment, the foregoing components will be given reference signs with characters T, P, or S, so that it is possible to understand that they are included in which of the information processing apparatuses implementing the tablet 102, the PC 104, and the server 103.

Since these information processing apparatuses perform operations described below, the tablet 102 may be expressed as information setting apparatus, the server 103 as information management apparatus, and the PC 104 as information generation apparatus.

Figure 5:
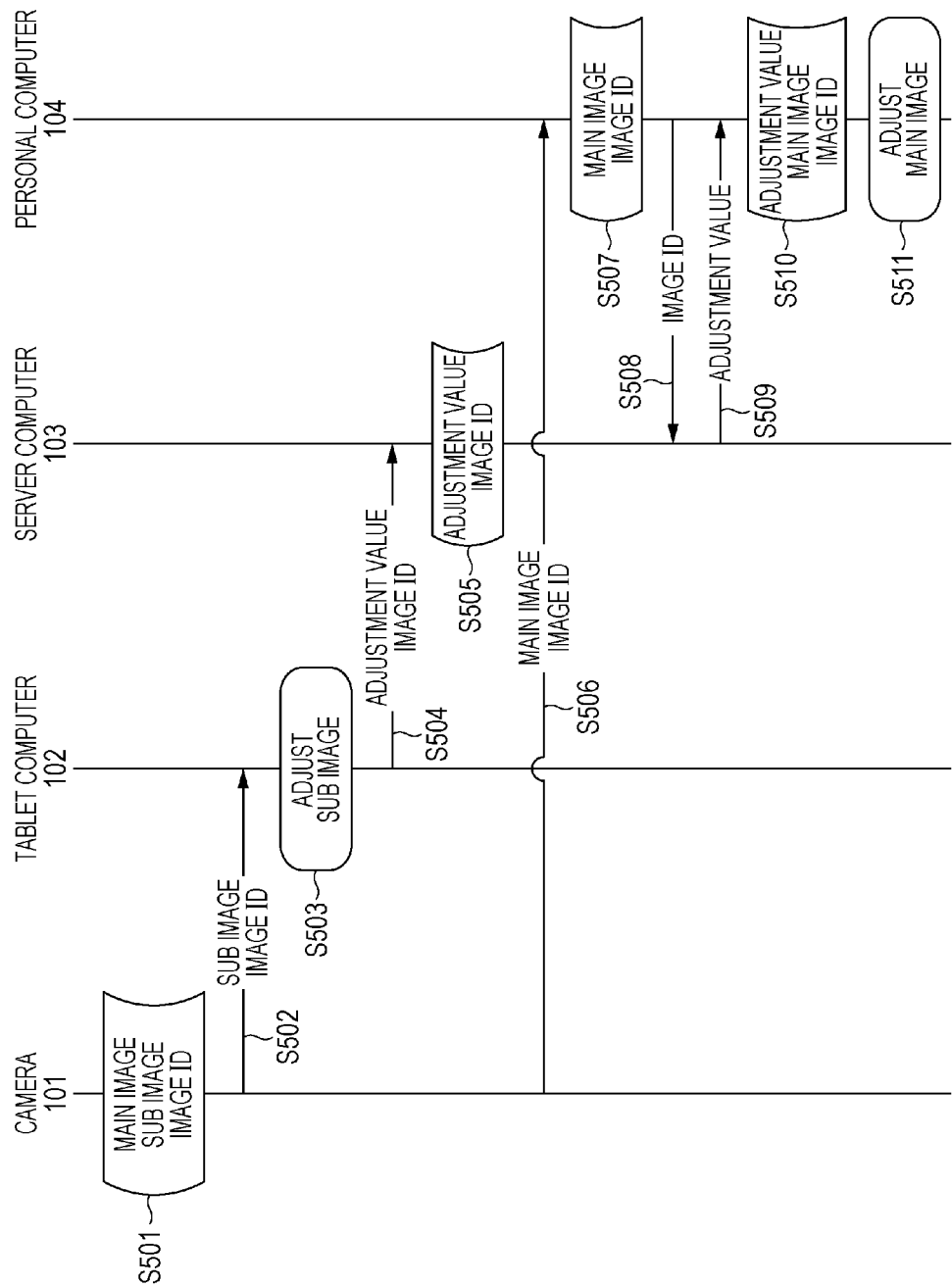
FIG. 5 is a sequence diagram illustrating an example of operations of a camera 101, a tablet 102, a server 103, and a PC 104 according to the embodiment of the present invention.

FIG. 5 is a sequence diagram illustrating operations of the camera 101, the tablet 102, the PC 104, and the server 103. The operations described below are implemented by the control units 261 and 401 for the camera 101, the tablet 102, the server 103, and the PC 104 executing control programs stored in the memories and the OS and the application programs stored in the memories and the storage devices to control the individual units.

First, the camera 101 performs an imaging process as described above, and records a RAW file 300 including the image ID 301, the sub image 302, and the main image 303 into the recording medium 252 as illustrated in FIG. 3A (S501). For the image ID 301, the camera 101 may generate the image ID unique to the RAW file 300 by using a serial number or the like unique to the individual camera 101. Alternatively, the camera 101 may request the server 103 for the image ID 301 unique to the RAW file 300 generated by the server 103.

The camera 101 uses the image ID 301 and the sub image 302 extracted from the RAW file 300 to produce a sub RAW file 310 as illustrated in FIG. 3B. The camera 101 then connects to the tablet 102 via near field wireless communications such as Bluetooth (registered trademark) or WiFi or wired communications using USB or the like to transmit the sub RAW file to the tablet 102 (S502). The tablet 102 receives the sub RAW file 310 and executes a development process on the sub image 302 using predetermined neutral parameters to produce a display sub image, and controls a display unit 411-T to display the display sub image. The tablet 102 then acquires an adjustment value for each adjustment item in response to the operation through the operation input device (S503). In this case, the adjustment items for the sub image 302 are brightness, white balance, color gradation, color density, sharpness, noise reduction, color space, and others.

The tablet 102 terminates the setting of the adjustment items for the sub image 302 in response to the operation through the operation input device. The tablet 102 connects to the server 103 via the network 105, and transmits to the server 103 adjustment information 320 including the image ID 301 and the adjustment values 322 of the adjustment items as illustrated in FIG. 3C (S504).

The server 103 receives the image ID 301 and the adjustment information 320 from the tablet 102 and stores them in association with each other in a storage device 404-S (S505).

Meanwhile, the camera 101 connects to the PC 104 via near field wireless communications such as Bluetooth (registered trademark) or WiFi or wired communications using USB or the like to transmit the RAW file 300 to the PC 104 (S506). The PC 104 receives the RAW file 300 and stores the same in a storage device 404-P (S507). The PC 104 connects to the server 103 via the network 105 to transmit the image ID 301 included in the RAW file 300 to the server 103 (S508). The server 103 receives the image ID 301 from the PC 104, reads the adjustment information 320 associated with the image ID 301 from the storage device 404-S, and transmits the same to the PC 104 (S509).

The PC 104 receives the image ID 301 and the adjustment information 320 from the server 103. The PC 104 further associates the received adjustment information with the image ID 301 and the RAW file 300, and stores the same in the storage device 404-P (S510). The PC 104 develops the main image 303 of the RAW file 300 using the adjustment values 322, and compresses the obtained data in a predetermined format such as JPEG to produce a developed image file (S511). Further, the PC 104 may also store the developed image file in association with the image ID 301 in the storage device 404-P.

The server 103 may manage association status indicating whether or not the adjustment information 320 is taken into the PC 104 and associated with the RAW file 300. For example, upon receipt of the adjustment information 320 from the server 103 (S509), the PC 104 determines whether the RAW file 300 associated with the same image ID as the adjustment information 320 is taken from the camera. That is, the PC 104 determines whether the RAW file 300 is stored in the storage device 404-P. When the RAW file 300 is already taken, the PC 104 associates the adjustment information 320 with the RAW file 300, stores the same in the storage device 404-P of the PC 104, and notifies that to the server 103. Accordingly, the server 103 updates the association status as "associated." In the case where the RAW file corresponding to the adjustment information 320 is not yet stored in the storage device 404-P, once the corresponding RAW file is stored, the PC 104 connects to the server 103 for notification of that. Accordingly, the server 103 updates the association status as "associated." Otherwise, in the case where the RAW file 300 is written in advance by the camera 101 into the PC 104, when the camera 101 transmits the sub RAW file 310 to the tablet 102, the PC 104 notifies that to the tablet. Then, the tablet 102 may notify that to the server 103 at the same time as the transmission of the adjustment information 320. When the association status is "not associated," it is considered that the RAW file 300 is not yet taken from the camera 101 into the PC 104. Accordingly, when the association status is still "not associated" even after a predetermined period of time has been elapsed since the server 103 received the adjustment information 320 from the tablet 102 and stored the same in the storage device 404-S, the server 103 may notify that to the tablet 102. Accordingly, the user can connect the camera 101 to the PC 104 to prompt the PC 104 to transmit the RAW file 300 and develop the RAW file 300.

In the foregoing case, the reduced RAW data is used as sub image. Instead of this, a developed JPEG image data may be used as sub image. In this case, the adjustable items are different between the main image and the sub image, and some adjustment items cannot be set for the sub image, such as white balance, for example. Accordingly, pre-specified adjustment values are applied to the non-settable adjustment items.

In the foregoing case, the image ID is unique to the RAW file 300. The image ID may be unique to each user in the case where the server 103 manages the RAW file 300 for each user.

Figure 6:
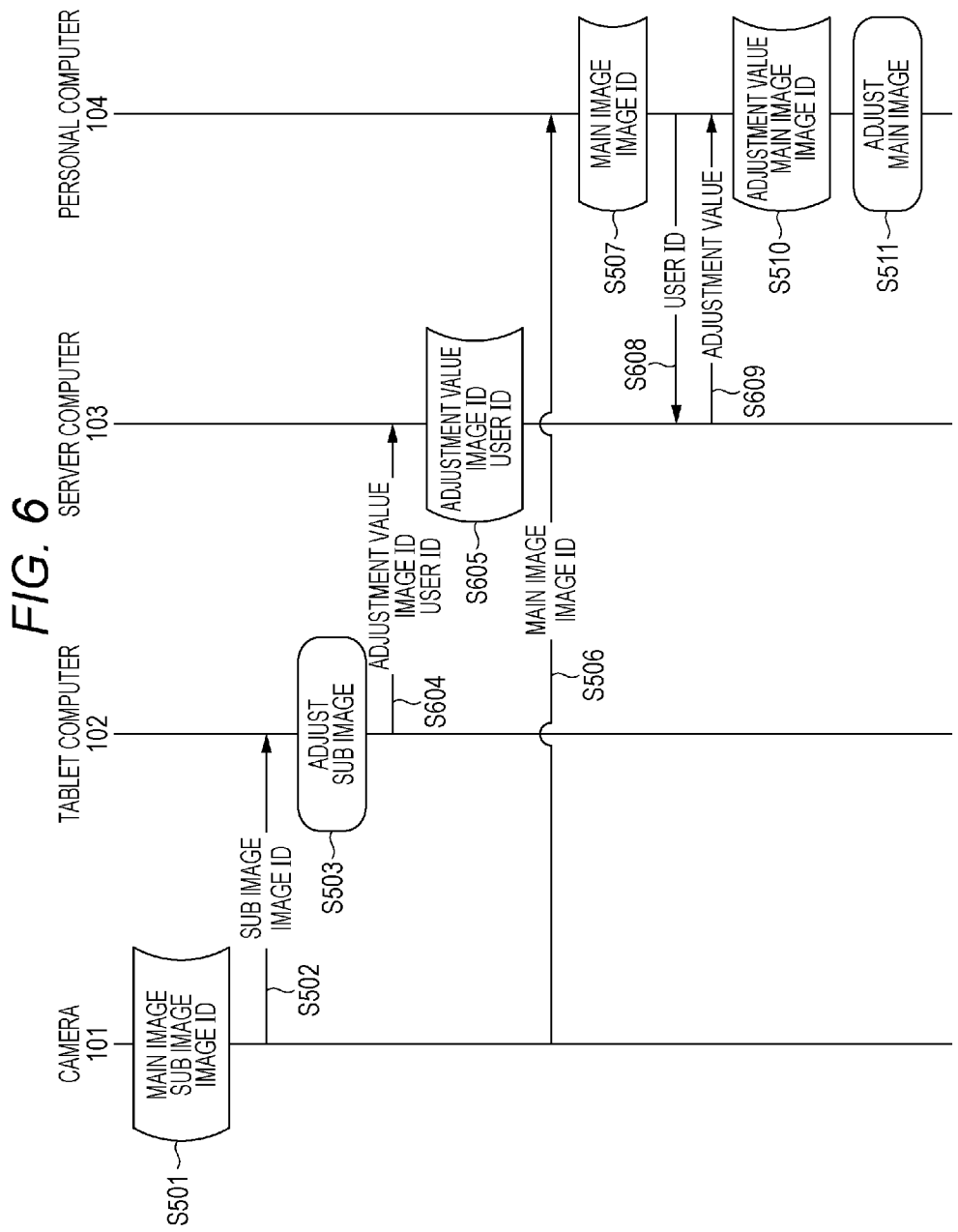
FIG. 6 is a sequence diagram illustrating an example of operations of the camera 101, the tablet 102, the server 103, and the PC 104 according to the embodiment of the present invention.

In the foregoing case, the server 103 manages the adjustment values only in association with the image ID. The adjustment value may also be managed in association with a user ID for unique identification of the user. In this case, the user merely needs to remember the one assigned user ID, and can acquire from the server 103 the adjustment values for a plurality of RAW files related to the user by entering the user ID into the PC 104 and transmitting the same to the server 103. Operations of the camera 101, the tablet 102, the server 103, and the PC 104 in this case will be described with reference to the sequence diagram in FIG. 6. The following operations are implemented by the control units 261 and 401 for the camera 101, the tablet 102, the server 103, and the PC 104 executing the control programs stored in the memories and the OS and the application programs stored in the memories and the storage devices to control the individual units. First, the camera 101 and the tablet 102 execute the same steps as steps S501 to S503 described in FIG. 5. The tablet 102 uploads the image ID 301, the adjustment information 320, and the user ID to the server 103 (S604). For the user ID, the tablet 102 may read the user ID having been already received from the camera 101 or the server 103, or the user may enter the user ID manually. The server 103 receives the image ID 301, the adjustment information 320, and the user ID from the tablet 102, and stores the same in association with one another in the storage device 404-S (S605). The camera 101 and the PC 104 then execute the same steps as steps S506 and S507 described in FIG. 5. The PC 104 transmits the user ID to the server 103 (S608). For the user ID, the tablet 102 may read the user ID having been already received from the camera 101, or the user may enter the user ID manually. The server 103 receives the user ID from the PC 104, reads the image ID and the adjustment information 320 associated with the user ID from the storage device 404-S, and transmits the same to the PC 104 (S609). The PC 104 then executes the same steps as steps S510 and S511 described in FIG. 5.

At step S601, the camera 101 may also transmit the user ID to the server 103. In this case, the server 103 may permit an adjustment process by the tablet 102 to be performed only on the adjustment values associated with the user ID coinciding with the user ID received from the tablet 102.

According to the configuration of the embodiment described above, the sub image is displayed on the display unit 411-T of the tablet 102 larger in screen size than the display unit 223 of the camera 101, thereby to allow the user to check easily changes in the results of the development process from the adjustment values. In addition, the camera 101 transmits the sub image smaller in data amount than the main image to the tablet 102, thereby reducing the load and time of the transmission process. The tablet 102 merely needs to hold the sub image smaller in data amount than the main image, thereby reducing memory consumption and decreasing the load of the display process. The image ID and the adjustment information 320 smaller in data amount than the main image and the sub image are exchanged between the tablet 102 and the server 103 and between the server 103 and the PC 104, thereby reducing significantly the communication load and the communication time. The adjustment values can be set on the easy-to-carry and movable tablet 102 to allow the user to set the adjustment values whenever and wherever the user chooses. The development process of the main image is performed by the PC 104 higher in processing ability than the camera 101 and the tablet 102 to shorten the time taken for the processing.

Second Embodiment

In relation to a second embodiment, descriptions will be given as to the case where there are a plurality of devices capable of generating adjustment information because the user has a plurality of tablets 102 and the PC 104. In the following descriptions, the same parts as those in the first embodiment will not be explained but the parts as features of the second embodiment will be described in detail.

In the embodiment, a tablet 102-1 takes in a sub RAW file from the camera 101, and uploads the same into the server 103 via the network 105. The server 103 then stores the sub RAW file and issues an URL for accessing the same. In response to the access to the URL of the sub RAW file, the server 103 accepts a request from tablet 102-N or the PC 104 and downloads the sub RAW file. Accordingly, the devices other than the tablet 102-1 can acquire the sub RAW file, set the adjustment values, generate adjustment information, and transmit the same to the server 103. Alternatively, a plurality of tablets 102-N may connect to the camera 101 to take in the sub RAW file. The tablet 102 and the PC 104 perform the same operations to implement the present invention, and therefore only the tablet 102 will be described below as an example.

In the embodiment, as illustrated in FIG. 7A, the server 103 manages the RAW file 300 with the image IDs unique to the individual users, and also manages update histories of adjustment information on the RAW file 300 with serial update numbers for the individual users. In the update process of adjustment information, the tablet 102 acquires the update numbers from the server 103 and manages the same in association with the image IDs as illustrated in FIG. 7B.

Figure 8:
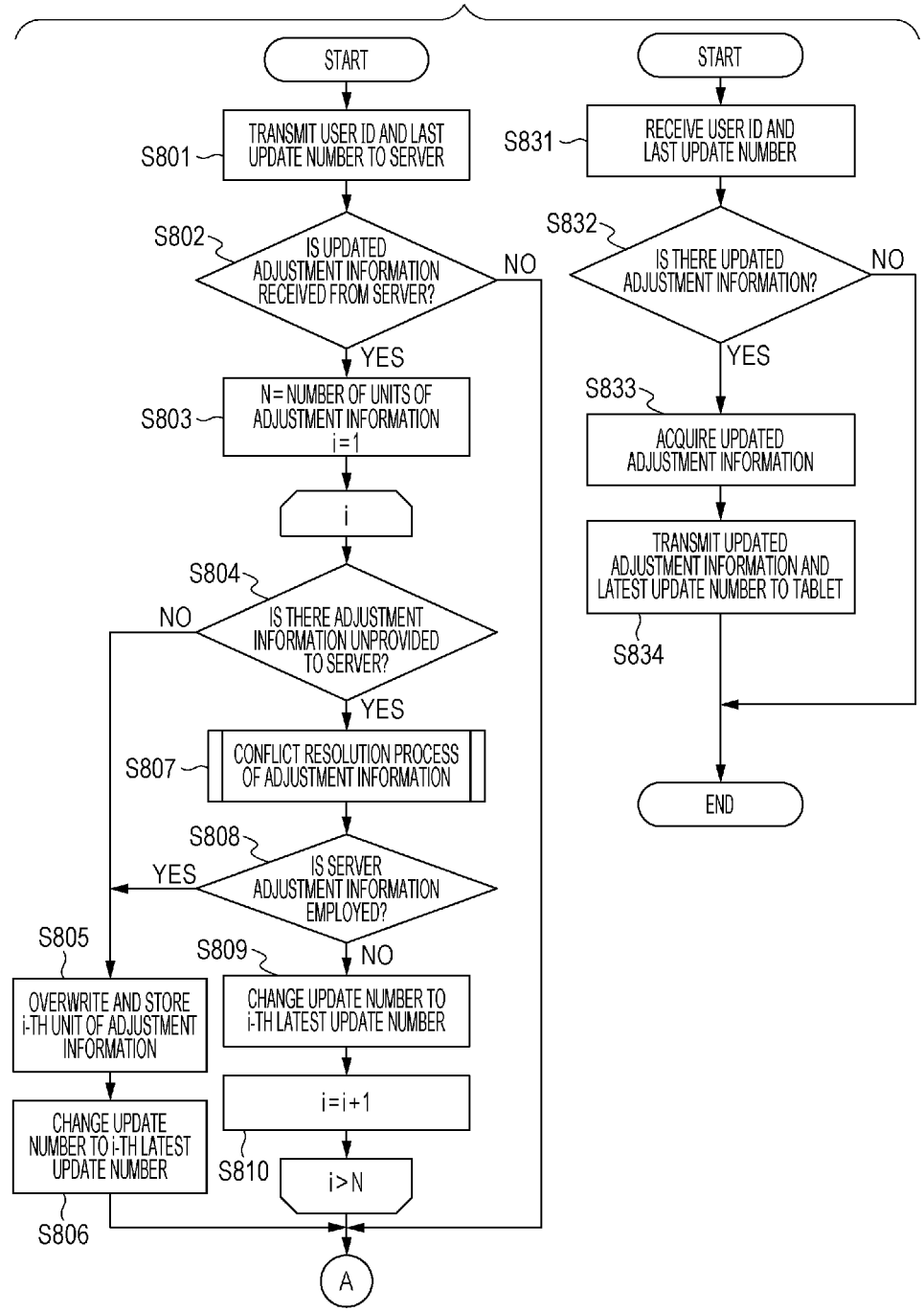
FIG. 8 is a flowchart of operation examples of the tablet 102 and the server 103 according to the embodiment of the present invention.

FIG. 8 is a flowchart of operations of the tablet 102 and the server 103 in the embodiment. The operations described below are implemented by the control units 401-T and 401-S for the tablet 102 and the server 103 executing the control programs stored in the memories and the OS and the application programs stored in the memories and the storage devices to control the individual units.

First, the tablet 102 accepts an input operation from the user and acquires the user ID, and acquires the largest one of the update numbers stored in an update management table 721 illustrated in FIG. 7B as the last update number. The tablet 102 then transmits the user ID and the last update number to the server 103 (S801).

Upon receipt of the user ID and the largest update number from the tablet 102 (S831), the server 103 acquires the largest one of the update numbers associated with the user IDs in a server update management table 711 as the latest update number, and compares the latest update number with the received last update number. When there is a match between these update numbers, the server 103 determines that there is no updated adjustment information (No: S832), and notifies that to the tablet and terminates the process. In contrast, when there is no match between these update numbers, the server 103 determines that there is updated adjustment information (Yes: S832), and acquires the adjustment information associated with the image ID with the update number larger than the last update number from the storage device 404-S (S833). The server 103 transmits the acquired adjustment information and its update number to the tablet 102 (S834).

The tablet 102 determines whether the adjustment information and its update number are received from the server 103. When there is no updated adjustment information (No: S802), the tablet 102 determines that there is no update in the adjustment information and terminates this process. Meanwhile, upon receipt of the adjustment information and its update number from the server 103 (Yes: S802), the tablet 102 counts the number of received units of adjustment information, substitutes the counted number into a variable N, and substitutes "1" as an initial value into a variable i (S803). The tablet 102 refers to the tablet update management table 721 to determine whether there is a non-notified adjustment value associated with the image ID included in the i-th adjustment information (S804). When there is no non-notified adjustment value (No: S804), the tablet 102 writes the i-th adjustment information over the adjustment information 320 with the image ID, and stores the same in the storage device 404-T (S805). For the record with the image ID in the tablet update management table 721, the tablet 102 changes the update number to the update number for the i-th adjustment information, and changes a flag indicating the presence or absence of unprovided adjustment information to the value indicating the absence of non-notified adjustment value (False) (S806). In contrast, when there is any unprovided adjustment information (Yes: S804), the tablet 102 executes a conflict resolution process described later based on the unprovided adjustment information and the i-th adjustment information (S807). The tablet 102 then determines whether the i-th adjustment information transmitted from the server 103 is selected as a result of the conflict resolution process (S808). When the i-th adjustment information is selected (Yes: S808), the tablet 102 executes steps S805 and S806 described above. In contrast, when the i-th adjustment information is not selected (No: S808), the tablet 102 changes the update number associated with the image ID in the tablet update management table 721 to the update number for the i-th adjustment information while holding the adjustment information adjusted on the tablet 102 in the storage device 404-T (S809). The tablet 102 adds 1 to the variable i (S810) and repeats steps S804 to S810 until the variable i exceeds the value of the variable N.

The conflict resolution process at step S808 will be here described. There are various possible methods for the conflict resolution process. For example, the adjustment information in either the tablet 102 or the server 103 may be selected. For example, the adjustment information in both the tablet 102 and the server 103 may include the last adjustment date and time such that the later one is selected. Alternatively, the adjustment information from the tablet 102 and the server 103 may be used to develop the sub image, and the development results may be displayed on the display unit 411-T of the tablet 102 such that the user can select the adjustment information from either the tablet 102 or the server 103 or can reset the adjustment information in the tablet 102. Alternatively, the user may select the adjustment information according to its contents. For example, the user may or may not select the adjustment information indicative of "deletion," or may select the adjustment information with the adjustment item "white balance." Alternatively, the sub image may be developed using the adjustment information from both the tablet 102 and the server 103, the obtained results may be subjected to image analysis, and the optimum adjustment information may be automatically selected according to the analysis results.

Descriptions will be given as to changes in the server update management table and the tablet update management table resulting from the process in the flowchart of FIG. 8 when the server update management table is in the state illustrated in FIG. 7A and the tablet update management table is in the state illustrated in FIG. 7B as of executing step S801. At step S801, the tablet 102 transmits the user ID "User_123" and the last update number "11." At step S832, the server 103 compares the latest update number "18" and the last update number "11." Since there is no match between these numbers, the server 103 determines that there is updated adjustment information. At step S833, the server 103 acquires image IDs "Img_A, Img_B, Img_E, Img_F, and Img_H" with larger update numbers than the last update number "11." At step S834, the server 103 reads the adjustment information 320 with the image IDs "Img_A, Img_B, Img_E, Img_F, and Img_H," from the storage device 404-S, and transmits the same in sequence to the tablet 102.

The tablet 102 refers to the tablet update management table 721 at step S804. Since the records with the image IDs Img_A and Img_B have no unprovided adjustment information (False), the tablet 102 writes the adjustment information received from the server 103 over the adjustment information with Img_A and Img_B, and stores the same in the storage device 404-T. In addition, since there is no record with the image ID Img_H, the tablet 102 determines that there is no unprovided adjustment information, and stores newly the adjustment information with Img_H in the storage device 404-T. At step S805, the tablet 102 changes the update numbers with Img_A and Img_B in the tablet update management table 721 to the update numbers "12" and "15" received from the server 103, respectively, and stores "17" as the update number with Img_H.

Meanwhile, the tablet 102 refers to the tablet update management table 721 at step S804. Since the records with the image IDs Img_E and Img_F have unprovided adjustment information (True), the tablet 102 performs the conflict resolution process at step S807. When the adjustment information received from the server 103 is not selected as a result of the conflict resolution process (No: S808), the tablet 102 keeps the adjustment information with the image IDs Img_E and Img_F without overwriting the adjustment information received from the server 103. The tablet 102 then changes the update numbers with Img_E and Img_F in the tablet update management table 721 to the update numbers "14" and "16" received from the server 103, respectively (S809).

FIG. 7C illustrates the tablet update management table after the operations in FIG. 8 as described above. The server update management table 711 remains unchanged.

Subsequently, the operations executed by the tablet 102 and the server 103 will be described with reference to the flowchart in FIG. 9. The operations described below are implemented by the control unit 401-T and the control unit 401-S for the tablet 102 and the server 103 executing the control programs stored in the memories and the OS and the application programs stored in the memories and the storage devices to control the individual units.

The tablet 102 refers to the update management table 722 of the tablet 102 to determine whether there is any adjustment information unprovided to the server 103. When there is no unprovided adjustment information (No: S901), the tablet 102 terminates this process. In contrast, when there is any unprovided adjustment information (Yes: S901), the tablet 102 transmits to the server 103 a request for updating the adjustment information together with the user ID, the largest update number in the update management table 722 of the table 102, and the unprovided adjustment information (S902).

The server 103 receives the user ID, the update number, and the unprovided adjustment information from the tablet 102 (S931). The server 103 then compares the received update number to the largest update number (latest update number) associated with the user ID in the update management table 711 of the server 103 (S932). When there is no match between these update numbers (No: S932), the server 103 instructs the tablet 102 to stop this process (S933). This takes place when the update number has been changed since another tablet 102-N uploaded the adjustment information to the server 103 during the duration between the completion of the conflict resolution process on the adjustment information at S808 in FIG. 8 and the execution of step S932. In response to this instruction (No: S903), the tablet 102 terminates this process, and returns to step S801 to execute the resolution process based on the latest adjustment information in the server 103 and the unprovided adjustment information in the tablet. In contrast, when there is a match between these update numbers (Yes: S932), the server 103 increments the largest update number associated with the user ID by "1" for the unprovided adjustment information to issue the latest update number (S934). The server 103 stores each unit of the adjustment information received at step S931 in association with a combination of the image ID and the latest update number (S935). The server 103 also notifies to the tablet 102 the new update numbers in combination with the image IDs (S936).

Upon receipt of the combinations of update numbers for adjustment information and image IDs from the server 103 (Yes: S903), the tablet 102 counts the number of units of unprovided adjustment information, substitutes the counted number to a variable M, and substitutes "1" as an initial value to a variable j (S904).

The tablet 102 changes the update numbers and the notification status associated with the image IDs in the adjustment information in the tablet 102, based on the combinations of update numbers and image IDs received from the server 103 (S905). The tablet 102 then adds 1 to the variable j (S906) and repeats steps S905 and S906 until the variable j exceeds the value of the variable M.

Upon receipt of the instruction for stoppage of this process, not the latest update number, from the server 103 (No: S903), the tablet 102 terminates this process.

Descriptions will be given as to changes in the server update management table and the tablet update management table resulting from the process in the flowchart of FIG. 9 when the server update management table is in the state illustrated in FIG. 7A and the tablet update management table is in the state illustrated in FIG. 7C as of executing step S901. At step S902, the tablet 102 transmits the user ID "User_123," the last update number "17," and unprovided adjustment information 320. The unprovided adjustment information 320 is adjustment information with the image IDs "Img_C, Img_E, Img_F, and Img_G." At step S932, the server 103 compares the latest update number "17" to the last update number "17." Since there is a match between these update numbers, the server 103 starts the process for updating the adjustment information at step S934. At step S934, the server 103 issues the latest update numbers "18, 19, 20, and 21." At step S935, the server 103 overwrites the adjustment information 320 with the image IDs "Img_C, Img_E, Img_F, and Img_G" received from the tablet 102 together with the issued update numbers in the storage device 404-S. At step S936, the server 103 notifies the issued update numbers to the tablet 102. At step S905, the tablet 102 changes the update numbers and the adjustment information in the tablet update management table to the update numbers "18, 19, 20, and 21" received from the server 103. The tablet 102 also changes the flag indicating the presence or absence of unprovided adjustment information to the value indicating the absence of unprovided adjustment information (False).

Figure 9:
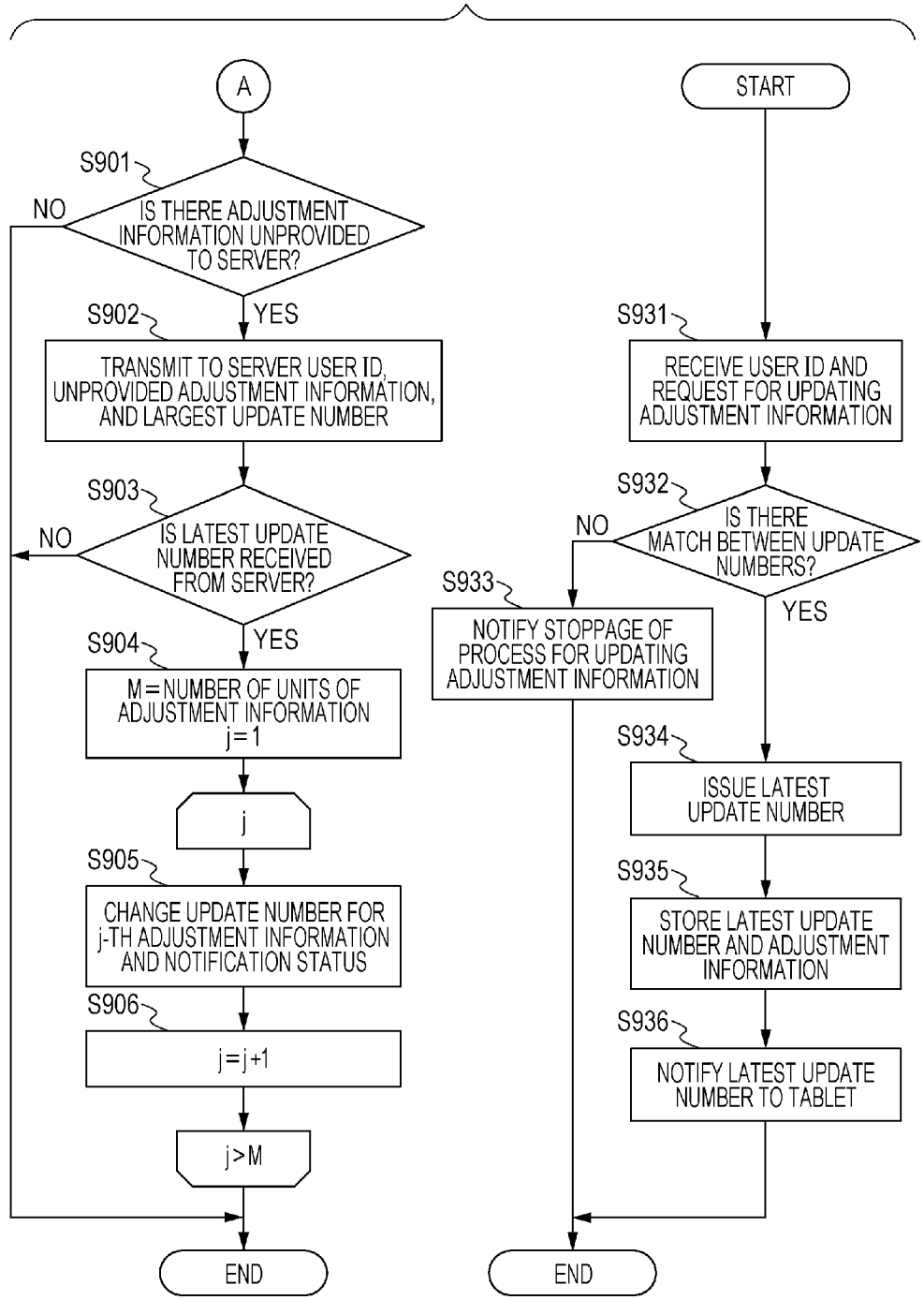
FIG. 9 is a flowchart of operation examples of the tablet 102 and the server 103 according to the embodiment of the present invention.

FIGS. 7D and 7E illustrate the server update management table and the tablet management table, respectively, after the operations in FIG. 9 as described above.

Third Embodiment

In relation to a third embodiment, descriptions will be given as to the mode in which a RAW file including a main image and a sub image is transmitted from the camera 101 to the tablet 102 and then is transmitted from the tablet 102 to the PC 104. In the following descriptions, the same parts as those in the first and second embodiments will not be explained but the parts as features of the third embodiment will be explained in detail.

Figure 10:
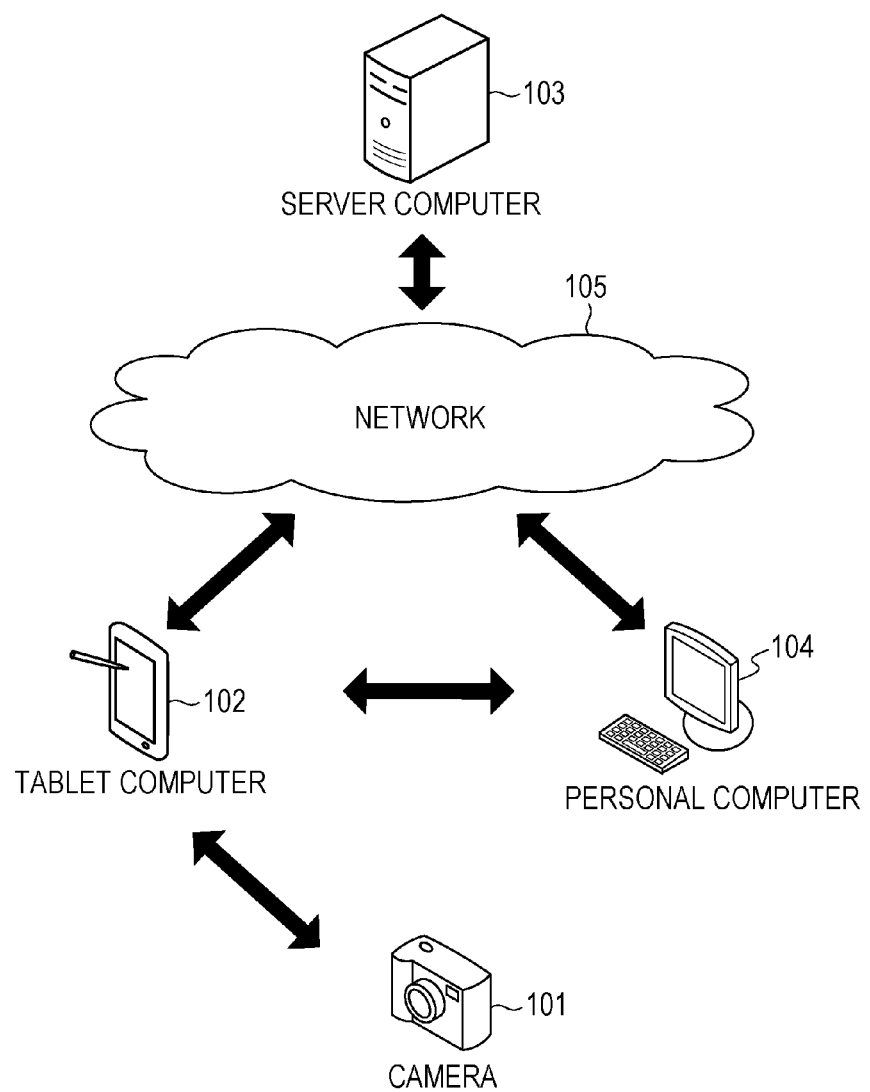
FIG. 10 is a diagram illustrating an example of an information processing system according to one embodiment of the present invention.

FIG. 10 is a diagram illustrating an entire configuration of an information processing system of the embodiment. In the information processing system of the embodiment, the camera 101 transmits a RAW file including a main image and a sub image to the tablet 102. The tablet 102 transmits the RAW file to the PC 104.

In the embodiment, the configurations of the camera 101, the tablet 102, the PC 104, and the server 103 are the same as those described above with reference to FIGS. 2 and 4. In addition, the RAW file and the adjustment information in the embodiment are the same as those in the first embodiment described above with reference to FIGS. 3A and 3C. In the embodiment, the camera 101 of the embodiment does not produce the sub RAW file 310 illustrated in FIG. 3B.

Figure 11:
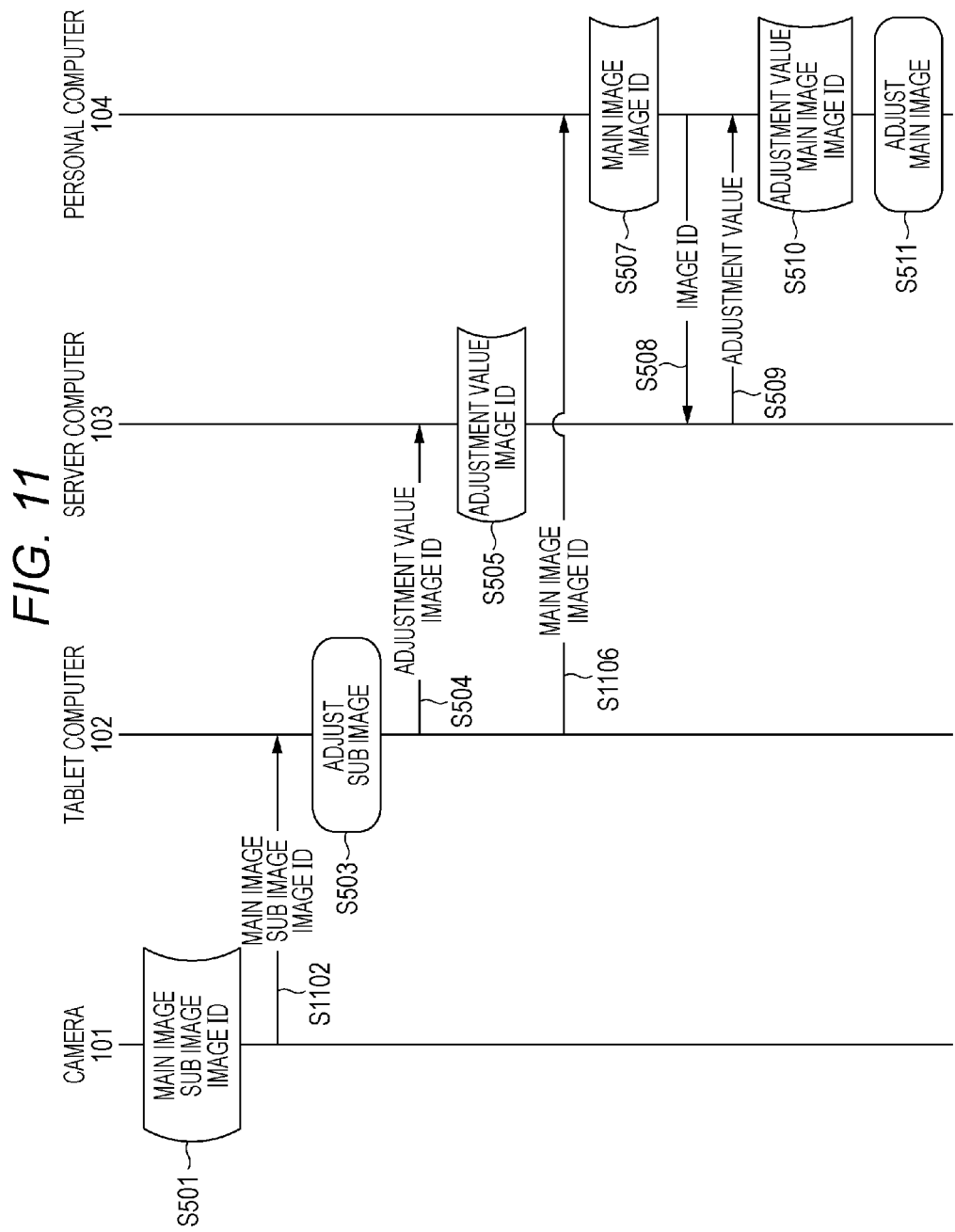
FIG. 11 is a sequence diagram illustrating an example of operations of the camera 101, the tablet 102, the server 103, and the PC 104 according to the embodiment of the present invention.

FIGS. 11 and 12 are sequence diagrams illustrating operations of the camera 101, the tablet 102, the PC 104, and the server 103 in the embodiment. The same parts as those in the first embodiment described above with reference to FIGS. 5 and 6 will not be explained but the parts as features of the embodiment will be explained in detail. The operations described below are implemented by the control units 261 and 401 for the camera 101, the tablet 102, the server 103, and the PC 104 executing the control programs stored in the memories and the OS and the application programs stored in the memories and the storage devices to control the individual units.

Referring to FIGS. 11 and 12, the camera 101 transmits the RAW file 300 including the image ID 301, the sub image 302, and the main image 303 to the tablet 102 (S1102). The tablet 102 receives the RAW file 300, develops the included sub image 302 using predetermined neutral parameters to produce a display sub image, and controls the display unit 411-T to display the display sub image. The tablet 102 also connects to the PC 104 to transmit the RAW file 300 to the PC 104 (S1106).

According to the configuration of the embodiment as described above, it is possible to display the sub image and adjust the sub image on the tablet 102 to reduce the loads of the display process and the adjustment process. In addition, the image ID and the adjustment information 320 smaller in data amount than the main image and the sub image are exchanged between the tablet 102 and the server 103 and between the server 103 and the PC 104, thereby to reduce significantly the communication load and the communication time. Further, since the tablet 102 stores the RAW file 300, the RAW file 300 in the camera 101 becomes unnecessary after the transmission of the RAW file 300 from the camera 101 to the tablet 102. Accordingly, the user can erase the RAW file 300 from the recording medium 252.

In the embodiment, the RAW file 300 is left in the tablet 102 even after the RAW file 300 is transmitted from the tablet 102 to the PC 104. Alternatively, the tablet 102 may automatically erase the RAW file 300. Otherwise, the tablet 102 may produce the sub RAW file 310 described in relation to the first embodiment from the RAW file 300 and replace the RAW file 300 by the sub RAW file 301.

According to the present invention, it is possible to perform image processing with a plurality of information communication devices different in capability while reducing the load of communication between the devices, and allow the user to perform operations related to the image processing using selectively an optimum device suited to the procedure of the image processing.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-065244, filed Mar. 26, 2015, and No. 2016-047057, filed Mar. 10, 2016, which are hereby incorporated by reference herein in their entirety.

What is claimed is:

1. An information processing system, comprising an information setting apparatus, an information management apparatus, an information generation apparatus, and an imaging apparatus being communicable with the information setting apparatus and the information generation apparatus, wherein
the imaging apparatus comprises:
a first processor; and
a first memory storing a program which, when executed by the first processor, causes the imaging apparatus to:
generate a main image and a sub image, a data amount of the sub image being smaller than a data amount of the main image;
store the main image and the sub image in association with an image ID;
transmit the image ID and the sub image to the information setting apparatus; and
transmit the image ID and the main image to the information generation apparatus which is different from the information setting apparatus,
the information setting apparatus comprises:
a second processor; and
a second memory storing a program which, when executed by the second processor, causes the information setting apparatus to:
execute a development process on the sub image and set an adjustment value for use in the development process; and
transmit the image ID and the adjustment value to the information management apparatus,
the information management apparatus comprises:
a third processor; and
a third memory storing a program which, when executed by the third processor, causes the information management apparatus to:
store the image ID and the adjustment value in association with each other;
receive the image ID from the information generation apparatus; and
transmit the adjustment value stored in association with the image ID to the information generation apparatus, and
the information generation apparatus comprises
a fourth processor; and
a fourth memory storing a program which, when executed by the fourth processor, causes the information generation apparatus to:
execute a development process on the main image using the adjustment value and generate the results of the development process.

2. An information setting apparatus, comprising:
a processor; and
a memory storing a program which, when executed by the processor, causes the information setting apparatus to:
connect to an imaging apparatus by a first connection method to receive from an imaging apparatus, a sub image and an image ID associated with a main image and the sub image which are generated by executing different compression processes on image data obtained by the imaging apparatus, a data amount of the sub image being smaller than a data amount of the main image;
execute a development process on the sub image and set an adjustment value for use in the development process; and
connect to an information management apparatus by a second connection method to transmit the image ID and the adjustment value to the information management apparatus, wherein
the adjustment value is transmitted from the information management apparatus to an information generation apparatus which is different from the information setting apparatus and the information management apparatus based on the image ID, and is used for a development process on the main image taken from the imaging apparatus into the information generation apparatus.

3. The information setting apparatus according to claim 2, wherein the program when executed by the processor further causes the information setting apparatus to control a display unit to display the results of the development process on the sub image.

4. The information setting apparatus according to claim 2, wherein the first connection method is connection via near field wireless communications or wired communications, and the second connection method is connection via the Internet.

5. An information generation apparatus, comprising:
a processor; and
a memory storing a program which, when executed by the processor, causes the information generation apparatus to:
connect to an imaging apparatus by a first connection method to receive from an imaging apparatus, a main image and an image ID associated with the main image and a sub image which are generated by executing different compression processes on image data obtained by the imaging apparatus, a data amount of the sub image being smaller than a data amount of the main image;
connect to an information management apparatus by a second connection method to receive an adjustment value associated with the image ID; and
execute a development process on the main image using the adjustment value and generate the results of the development process, wherein the adjustment value is set by another apparatus executing a development process on the sub image and is stored in association with the image ID in the information management apparatus.

6. The information generation apparatus according to claim 5, wherein the program when executed by the processor further causes the information generation apparatus to control a display unit to display the results of the development process on the main image.

7. The information generation apparatus according to claim 5, wherein the program when executed by the processor further causes the information generation apparatus, upon receipt of the main image and the image ID, to notify that to the information management apparatus.

8. The information generation apparatus according to claim 5, wherein the first connection method is connection via near field wireless communications or wired communications, and the second connection method is connection via the Internet.

9. The information generation apparatus according to claim 5, wherein the main image and the sub image are generated by executing different compression processes on data obtained by the imaging apparatus.

10. An imaging apparatus, comprising:
a processor; and
a memory storing a program which, when executed by the processor, causes the imaging apparatus to:
generate a main image and a sub image obtained by an imaging unit, a data amount of the sub image being smaller than a data amount of the main image;
store the main image and the sub image in association with an image ID;
connect to an information setting apparatus by a first connection method to transmit the image ID and the sub image to the information setting apparatus; and
connect to an information generation apparatus by a second connection method to transmit the image ID and the main image to the information generation apparatus which is different from the information setting apparatus, wherein
the information generation apparatus executes a development process on the main image using adjustment information set by the information setting apparatus executing a development process on the sub image.

11. The imaging apparatus according to claim 10, wherein the first connection method is connection via near field wireless communications or wired communications, and the second connection method is connection via the Internet.

12. A non-transitory computer-readable storage medium storing a program for causing a computer to
connect to an imaging apparatus by a first connection method to receive from an imaging apparatus, a sub image and an image ID associated with a main image and the sub image which are generated by executing different compression processes on image data obtained by the imaging apparatus, a data amount of the sub image being smaller than a data amount of the main image;
execute a development process on the sub image and set an adjustment value for use in the development process; and
connect to an information management apparatus by a second connection method to transmit the image ID and the adjustment value to the information management apparatus, wherein
the adjustment value is transmitted from the information management apparatus to an information generation apparatus which is different from the computer and the information management apparatus based on the image ID, and is used for a development process on the main image taken from the imaging apparatus into the information generation apparatus.

13. A non-transitory computer-readable storage medium storing a program for causing a computer to
connect to an imaging apparatus by a first connection method to receive from an imaging apparatus, a main image and an image ID associated with the main image and a sub image which are generated by executing different compression processes on image data obtained by the imaging apparatus, a data amount of the sub image being smaller than a data amount of the main image;
connect to an information management apparatus by a second connection method to receive an adjustment value associated with the image ID; and
execute a development process on the main image using the adjustment value and generate the results of the development process, wherein
the adjustment value is set by another apparatus executing a development process on the sub image and is stored in association with the image ID in the information management apparatus.

14. A non-transitory computer-readable storage medium storing a program for causing a computer to
generate a main image and a sub image obtained by an imaging unit, a data amount of the sub image being smaller than a data amount of the main image;
store the main image and the sub image in association with an image ID;
connect to an information setting apparatus by a first connection method to transmit the image ID and the sub image to the information setting apparatus; and
connect to an information generation apparatus by a second connection method to transmit the image ID and the main image to the information generation apparatus which is different from the information setting apparatus, wherein
the information generation apparatus executes a development process on the main image using adjustment information set by the information setting apparatus executing a development process on the sub image.

15. A control method for information setting apparatus, comprising:
a reception step of connecting to an imaging apparatus by a first connection method to receive from an imaging apparatus, a sub image and an image ID associated with a main image and the sub image which are generated by executing different compression processes on image data obtained by the imaging apparatus, a data amount of the sub image being smaller than a data amount of the main image;
a step of executing a development process on the sub image and setting an adjustment value for use in the development process; and
a step of connecting to an information management apparatus by a second connection method to transmit the image ID and the adjustment value to the information management apparatus, wherein
the adjustment value is transmitted from the information management apparatus to an information generation apparatus which is different from the information setting apparatus and the information management apparatus based on the image ID, and is used for a development process on the main image taken from the imaging apparatus into the information generation apparatus.

16. A control method for information generation apparatus, comprising:
    a reception step of connecting to an imaging apparatus by a first connection method to receive from an imaging apparatus, a main image and an image ID associated with the main image and a sub image which are generated by executing different compression processes on image data obtained by the imaging apparatus, a data amount of the sub image being smaller than a data amount of the main image;
    a step of connecting to an information management apparatus by a second connection method to receive an adjustment value associated with the image ID; and
    a step of executing a development process on the main image using the adjustment value and generating the results of the development process, wherein
    the adjustment value is set by another apparatus executing a development process on the sub image and is stored in association with the image ID in the information management apparatus.

17. A control method for imaging apparatus, comprising the steps of:
    generating a main image and a sub image obtained by an imaging unit of the imaging apparatus, a data amount of the sub image being smaller than a data amount of the main image;
    storing the main image and the sub image in association with an image ID;
    connecting to an information setting apparatus by a first connection method to transmit the image ID and the sub image to the information setting apparatus; and
    connecting to an information generation apparatus by a second connection method to transmit the image ID and the main image to the information generation apparatus which is different from the information setting apparatus, wherein
    the information generation apparatus executes a development process on the main image using adjustment information set by the information setting apparatus executing a development process on the sub image.

* * * * *